March 4, 1924.     E. E. GURR     1,485,979
HAND WARMER
Filed March 12, 1923
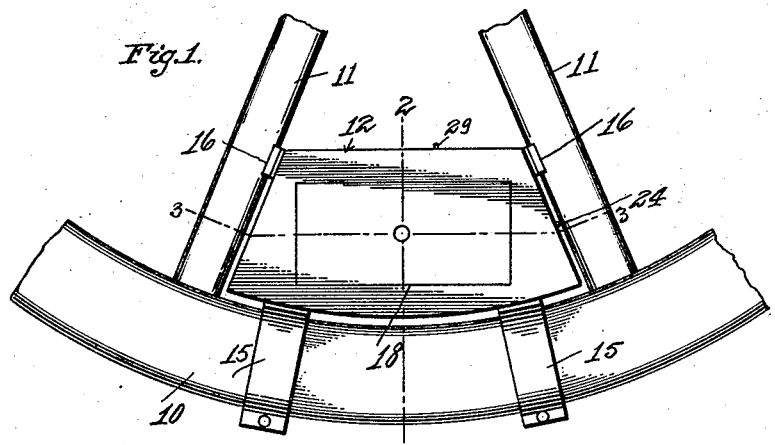
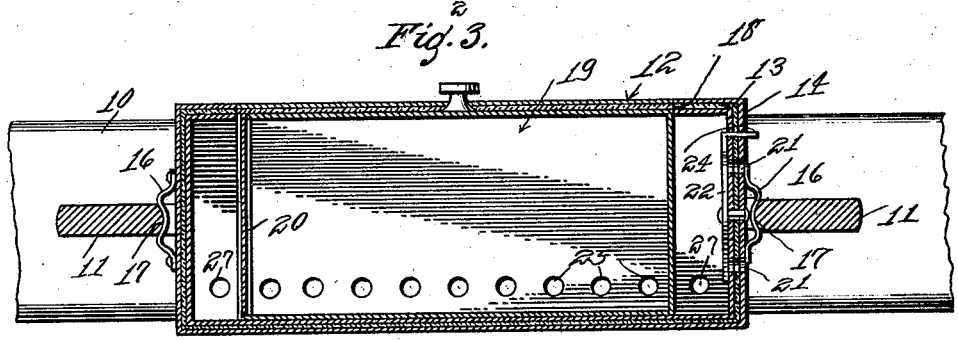
Inventor
Ethel E. Gurr Patented Mar. 4, 1924.

1,485,979

UNITED STATES PATENT OFFICE.

ETHEL E. GURR, OF OXFORD, OHIO.

HAND WARMER.

Application filed March 12, 1923. Serial No. 624,572.

*To all whom it may concern:*

Be it known that I, ETHEL E. GURR, a citizen of the United States, residing at Oxford, in the county of Butler, State of Ohio, have invented certain new and useful Improvements in Hand Warmers; and I do hereby declare the following to be a full, clear and exact description of the invention, such as will enable others skilled in the art to which it appertains to make and use the same.

This invention relates to new and useful improvements in warming devices and particularly to devices for warming the hands of drivers of automobiles.

One object of the invention is to provide a device of this character which can be easily and quickly applied to or removed from the steering wheel of an automobile, and which is in position for easy access to warm the hands.

Another object is to provide novel means for attaching the warmer to the wheel, and whereby the warmer will not rattle or become displaced while the automobile is in motion.

Other objects and advantages will be apparent from the following description when taken in connection with the accompanying drawing.

In the drawing:

Figure 1 is a plan view of the steering wheel of an automobile showing the invention applied thereto.

Figure 2 is an enlarged vertical transverse sectional view on the line 2—2 of Figure 1.

Figure 3 is an enlarged vertical longitudinal central sectional view on the line 3—3 of Figure 1, the section also passing through two adjacent spokes of the steering wheel.

Figure 4 is an end view of the warmer, partly in section.

Figure 5 is a rear view of the warmer, partly in section.

Referring particularly to the accompanying drawings, 10 represents the rim, and 11 the spokes of the steering wheel of an automobile.

Disposed between the outer ends of two adjacent spokes of the wheel is a metal box 12, which is covered with asbestos 13, and an outer layer of carpet, or some other suitable fabric 14. The box is generally rectangular in outline, except that the side which lies against the inner face of the rim of the wheel is curved longitudinally to fit snugly thereagainst. In this curved side are secured the clamps 15 which are arranged to embrace the rim of the wheel, to hold the box projected forwardly between the spokes. On each end of the box there is secured a spring finger 16 which has an intermediate bend or link 17 arranged on the said spoke, to hold the box from swinging downwardly on the rim of the wheel.

In the upper side of the box there is formed a longitudinal elongated opening 18 through which the charcoal containing pan or receptacle 19 is arranged to be introduced, the top of the pan lying in the plane of the top of the metal box when in proper position. The pan is provided with a removable lid 20, which permits introduction of charcoal thereinto. In one end of the box 12 there are formed the circular series of openings 21, and rotatably mounted on the inner face of said end of the box is a disk 22 having an equal number of openings 23 arranged to register with the openings 21, when the disk is rotated. A pin 24 is carried by the disk 22, adjacent its periphery, and projects through an arcuate slot formed in the end of the box, said pin being arranged to be grasped to rotate the disk and register or unregister the openings 23 with the openings 22. In one lower portion of the longer vertical side of the pan 19 there are formed the draft openings 25, and in the corresponding portion of one end of the pan are formed similar openings 26. In the lower portion of the longer straight side of the box there are formed the longitudinal series of openings 27, similar to the openings 21, and mounted on the inner face of said side, for longitudinal slidable movement, is a slidable plate 28, said plate having a series of openings of equal size and number to the openings 27, and arranged to register therewith. A pin 29 is carried by the plate 28 and projects through a longitudinal slot 30 formed in the said longer side of the box, whereby the plate may be moved to cover and uncover the openings 27. Thus, by means of the rotary disk 22, and the slidable plate 28, sufficient air may be permitted to enter the box 12, and pass through the openings 25 and 26, to supply the proper amount of oxygen to produce the required combustion to the charcoal within the pan.

The device is preferably located at the lower side of the steering wheel so that the driver may conveniently place his hand over the warmer. Drivers of open automobiles, such as trucks, are exposed to the wind which passes in from the side of the automobile, and in cold weather the hands become very cold, even when clad in heavy gloves. With a device of this character, over which the driver may, from time to time, place one hand and then the other, for the purpose of warming them, a common discomfort is avoided.

What is claimed is:

A hand warmer for attachment to the steering wheel of an automobile comprising an approximately trapezoidal box one longer side of which is longitudinally curved to lie against the inner curved face of the wheel rim, the upper wall of the box being formed with an access opening, a fuel receptacle disposed within said opening, draft openings in the box and receptacle, wheel rim engaging clamps carried by said curved side of the box, the inclined ends of the box adapted to lie against the side faces of an adjacent pair of spokes, and spring members secured to the end walls and having their intermediate portions depressed for engaging the said adjacent spokes.

In testimony whereof, I affix my signature, in the presence of two witnesses.

ETHEL E. GURR.

Witnesses:
BERTHA BECKETT,
CALVIN GURR.